(12) United States Patent
Wang et al.

(10) Patent No.: US 9,224,194 B2
(45) Date of Patent: Dec. 29, 2015

(54) JOINT VIDEO DEBLURRING AND STABILIZATION

(71) Applicant: Adobe Systems Incorporated, San Jose, CA (US)

(72) Inventors: Jue Wang, Kenmore, WA (US); Sunghyun Cho, Seattle, WA (US); Dun-Yu Hsiao, Seattle, WA (US); Shuaicheng Liu, Singapore (SG)

(73) Assignee: Adobe Systems Incorporated, San Jose, CA (US)

( * ) Notice: Subject to any disclaimer, the term of this patent is extended or adjusted under 35 U.S.C. 154(b) by 62 days.

(21) Appl. No.: 14/160,424

(22) Filed: Jan. 21, 2014

(65) Prior Publication Data

US 2015/0206289 A1   Jul. 23, 2015

(51) Int. Cl.
| | | |
|---|---|---|
| G06K 9/40 | (2006.01) |
| H04N 5/228 | (2006.01) |
| G06T 5/00 | (2006.01) |
| G06T 5/50 | (2006.01) |

(52) U.S. Cl.
CPC . *G06T 5/003* (2013.01); *G06T 5/50* (2013.01); *G06T 2207/10016* (2013.01); *G06T 2207/20016* (2013.01); *G06T 2207/20021* (2013.01); *G06T 2207/20182* (2013.01); *G06T 2207/20201* (2013.01)

(58) Field of Classification Search
CPC ............... G06T 5/003; G06T 2207/10016; G06T 2207/20201
USPC ............... 382/255, 263, 266, 294; 348/208.4, 348/208.99
See application file for complete search history.

(56) References Cited

U.S. PATENT DOCUMENTS

| | | | | |
|---|---|---|---|---|
| 7,548,659 | B2 * | 6/2009 | Ofek et al. ............ | 382/254 |
| 8,520,085 | B2 * | 8/2013 | Chen et al. ............ | 348/208.99 |
| 2014/0362240 | A1 * | 12/2014 | Klivington et al. ....... | 348/208.1 |

* cited by examiner

*Primary Examiner* — Kanjibhai Patel
(74) *Attorney, Agent, or Firm* — Wolfe-SBMC

(57) ABSTRACT

Joint video deblurring and stabilization techniques are described. In one or more implementations, a deblurring and stabilization module is configured to jointly deblur and stabilize a video by grouping video frames into spatial-neighboring frame clusters, and building local mesh homographies for video frames in each spatial-neighboring frame cluster.

20 Claims, 7 Drawing Sheets

JOINT VIDEO DEBLURRING AND STABILIZATION

BACKGROUND

Videos captured by hand-held cameras often contain significant camera shake causing the video to be blurry. Restoring shaky videos not only requires smoothing the camera motion and stabilizing the content, but also demands removing blur from video frames. It is difficult, however, to remove blur from video frames using existing single or multiple image deblurring techniques.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

Joint video deblurring and stabilization techniques are described. In one or more implementations, a deblurring and stabilization module is configured to jointly deblur and stabilize a video by grouping video frames into spatial-neighboring frame clusters, and building local mesh homographies for video frames in each spatial-neighboring frame cluster.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
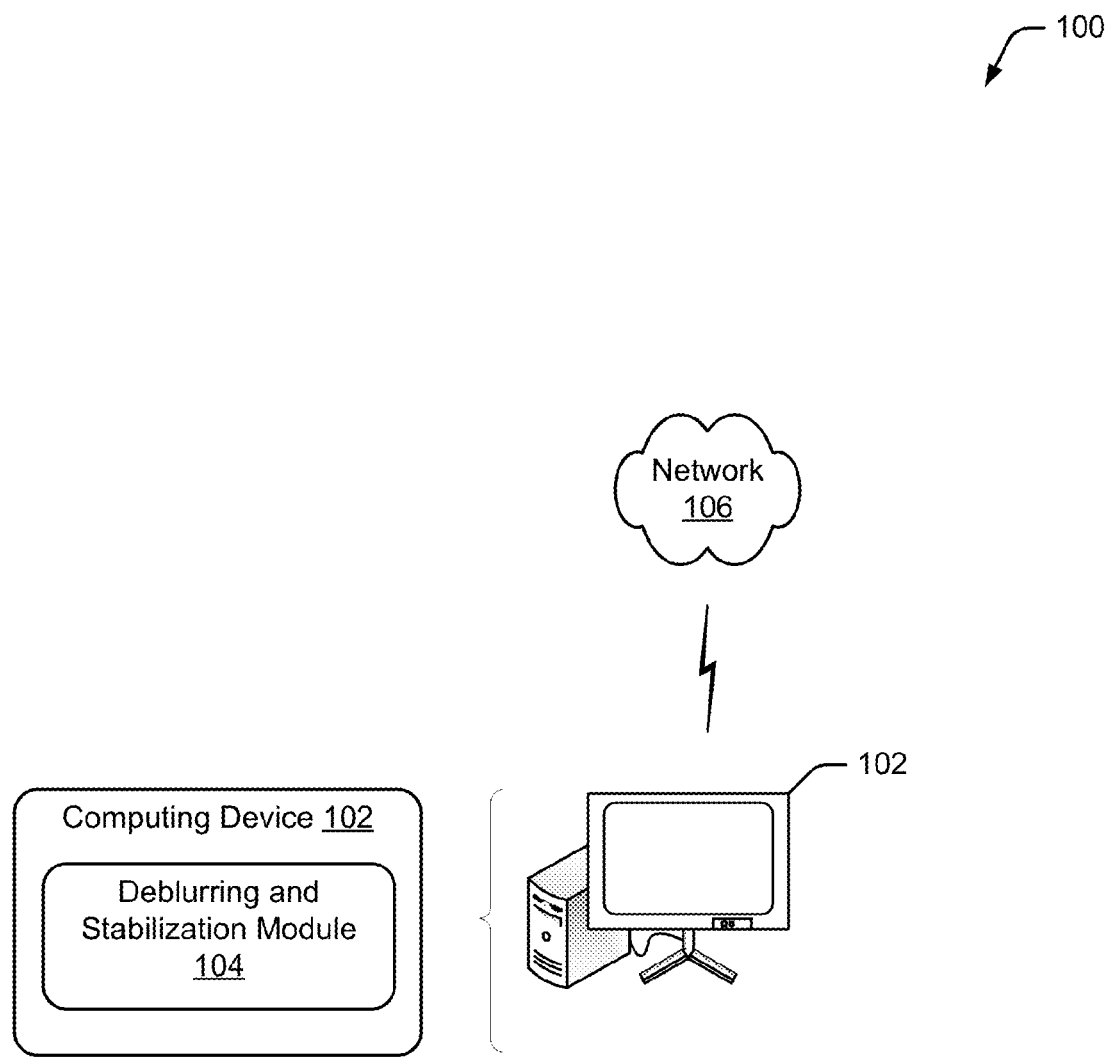
FIG. 1 illustrates an environment in an example implementation that is operable to employ techniques described herein.

Videos captured by hand-held cameras often contain significant camera shake, causing the video to be blurry. However, due to the nature of camera shake, not all video frames are equally blurry. For instance, an object may appear sharp in some video frames while blurry in others. Thus, sharp regions in a video frame can be detected and used to restore blurry regions of the same content in other video frames. Videos captured using hand-held cameras may also be shaky. Video stabilization techniques can reduce the shakiness of a video by smoothing the camera motion from an estimated camera motion model.

As both shakiness and blur are caused by hand motion of the user of the video-capturing device, techniques are described herein to improve video quality by performing deblurring and stabilizing at the same time. These techniques provide a more efficient way to reconstruct blurry frames of a video to generate higher quality videos with less processing time.

For example, in conventional video deblurring solutions, there is a trade-off between frame search range for sharp frames and the number of reconstruction iterations. In order to generate the highest video quality, for instance, conventional deblurring algorithms either increase the search range or increase the number of iterations for the deblurring algorithm. Due to the varying lengths of video, however, it is difficult to determine optimal values for frame search range and the number of iterations. Further, both of these solutions dramatically increase the overall processing time of the deblurring algorithm.

In order to avoid the trade-off between frame search range and the number of iterations, techniques are described to deblur a video using spatial-neighboring frames of the video instead of temporal-neighboring frames. To do so, spatial-neighboring frames of the video are identified and grouped into spatial-neighboring frame clusters, and a spatial registration is generated. As described herein, spatial-neighboring frames correspond to video frames that include a large overlap in content (e.g., frames that include the same or similar images).

Spatial-neighboring frames can be distinguished from temporal-neighboring frames which correspond to video frames that neighbor each other based on time. The concept of spatial-neighboring frames can be better understood from the following example. Consider that a user is filming a basketball game using a handheld video-capturing device. To begin the video, the user films a first basketball hoop on a right side of the basketball court relative to the user as a first team tries to score. The user then pans the video-capturing device to the left to film a second basketball hoop on the left side of the basketball court as a second team tries to score. Responsive to the first team stealing the ball from the second team, the user pans the camera back to the right to again film the first basketball hoop on the right side of the court as the first team scores a basket.

In this example, video frames at the beginning of the video and the end of the video both include similar content corresponding to the first basketball hoop on the right side of the basketball court. Thus, the frames at the beginning and the end of the video are spatial-neighboring frames, even though they are far apart in terms of time and thus are not temporal-neighboring frames.

Additionally, conventional video deblurring solutions use a single homography to transform blurry frames into sharp frames. However, a single homography is not sufficient to describe the transformation from one video frame to a next video frame because video scenes usually contain objects with varying depths from the video-capturing device. Techniques described herein, therefore, use a local mesh homography, rather than a single homography, to map multiple regions in a given video frame to corresponding regions in a different video frame. In one or more implementations the local mesh homography is further refined during video processing to provide an even more accurate local mesh homography. The accurate local mesh homography along with spatial frame registration enables the techniques described herein to better handle the parallax effect on complex video scenes.

In one or more implementations, a deblurring and stabilization module is configured to jointly deblur and stabilize videos. To do so, the deblurring and stabilization module groups spatial-neighboring video frames of a video into spatial-neighboring frame clusters, and builds local mesh homographies for video frames in each spatial-neighboring frame cluster. Next, the deblurring and stabilization module generates a frame sharpness estimate for each video frame, and generates a spatial frame registration using the local mesh homographies and the frame sharpness estimates.

The deblurring and stabilization module can then identify one or more blurry patches in one or more of the video frames. For each blurry patch, the deblurring and stabilization module performs a local search, using the spatial frame registration, to identify a corresponding sharp patch in a spatial-neighboring video frame to replace the blurry patch.

The deblurring and stabilization module then refines the local mesh homographies based on the local search, and stabilizes the refined local mesh homographies. A deblurred and stabilized video can then be rendered by the deblurring and stabilization module using the refined and stabilized local mesh homographies, by replacing blurry patches in video frames with sharp patches.

Example Environment

FIG. 1 illustrates an environment 100 in an example implementation that is operable to employ techniques described herein. Environment 100 includes a computing device 102, which may be configured in a variety of different ways.

Computing device 102, for instance, may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to a low-resource device with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

In some cases, computing device 102 can be implemented as a video-capturing device that is configured to capture video and/or images. As described herein, a video-capturing device may include any device that is configured to capture video, including but not limited to, handheld-video capturing devices, such as a camera, a laptop computer, a mobile device (e.g., assuming a handled configuration such as a tablet or mobile phone), and the like.

Computing device 102 is illustrated as including a deblurring and stabilization module 104, which may also be referred to herein as "module 104". Module 104 is representative of functionality to perform one or more techniques to jointly deblur and stabilize videos. In some cases, module 104 can jointly deblur and stabilize videos captured by computing device 102 (e.g., when computing device 102 is implemented as a video-capturing device). In other cases, module 104 can jointly deblur and stabilize videos captured by video-capturing devices other than computing device 102. Further discussion of video deblurring and stabilization techniques implemented by module 104 can be found in FIG. 2.

Figure 7:
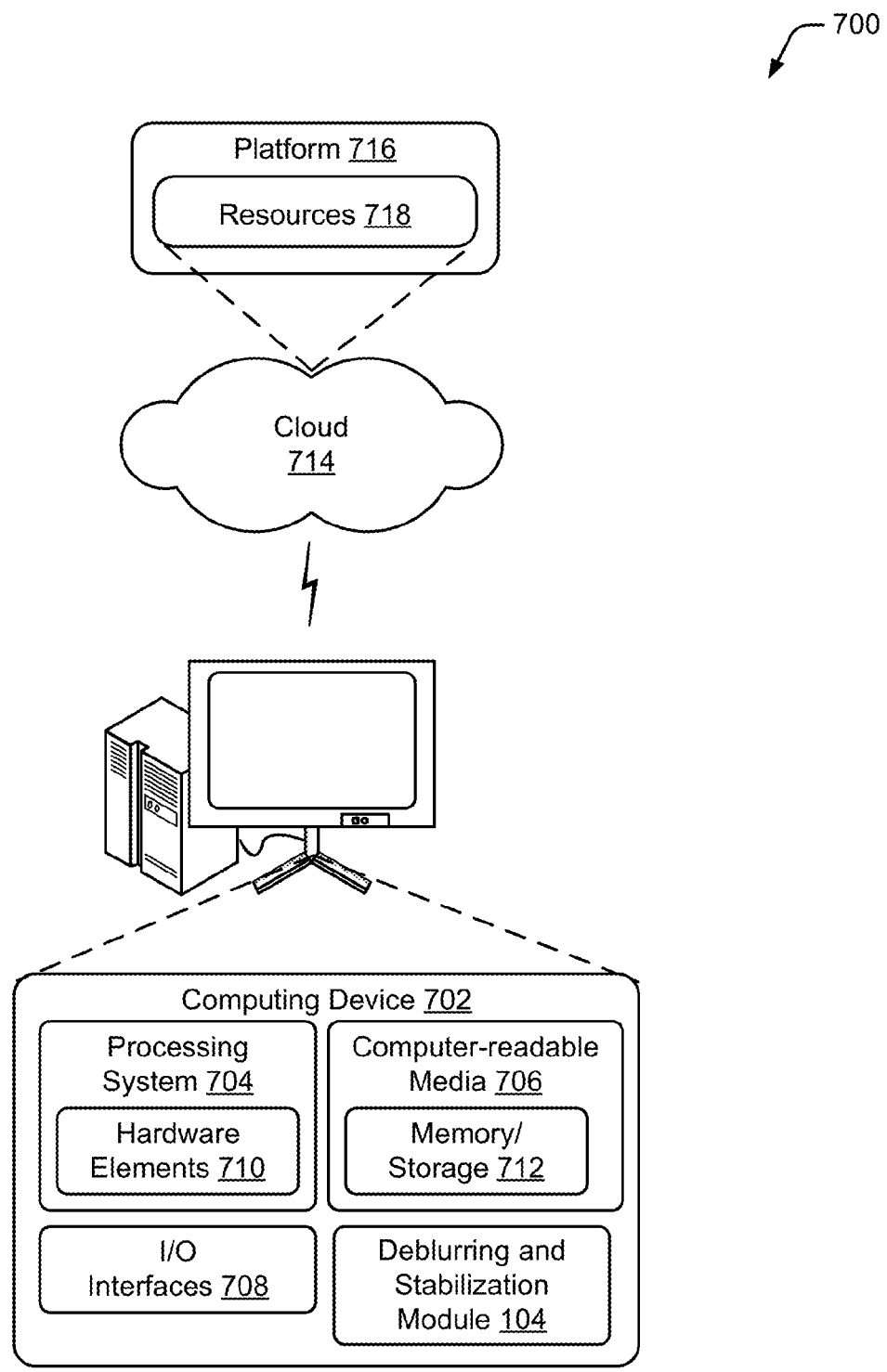
FIG. 7 illustrates an example system including various components of an example device that can be implemented as any type of computing device as described and/or utilized with reference to FIGS. 1-6 to implement embodiments of the techniques described herein.

Although illustrated as part of computing device 102, functionality of module 104 may also be implemented in a distributed environment, remotely via a network 106 (e.g., "over the cloud") as further described in relation to FIG. 7, and so on. Although network 106 is illustrated as the Internet, the network may assume a wide variety of configurations. For example, network 106 may include a wide area network (WAN), a local area network (LAN), a wireless network, a public telephone network, an intranet, and so on. Further, although a single network 106 is shown, network 106 may also be configured to include multiple networks.

Example Procedure

The following discussion describes joint video deblurring and stabilization techniques that may be implemented by deblurring and stabilization module 104 (FIG. 1). Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1, and to examples illustrated in FIGS. 3-6.

Figure 2:
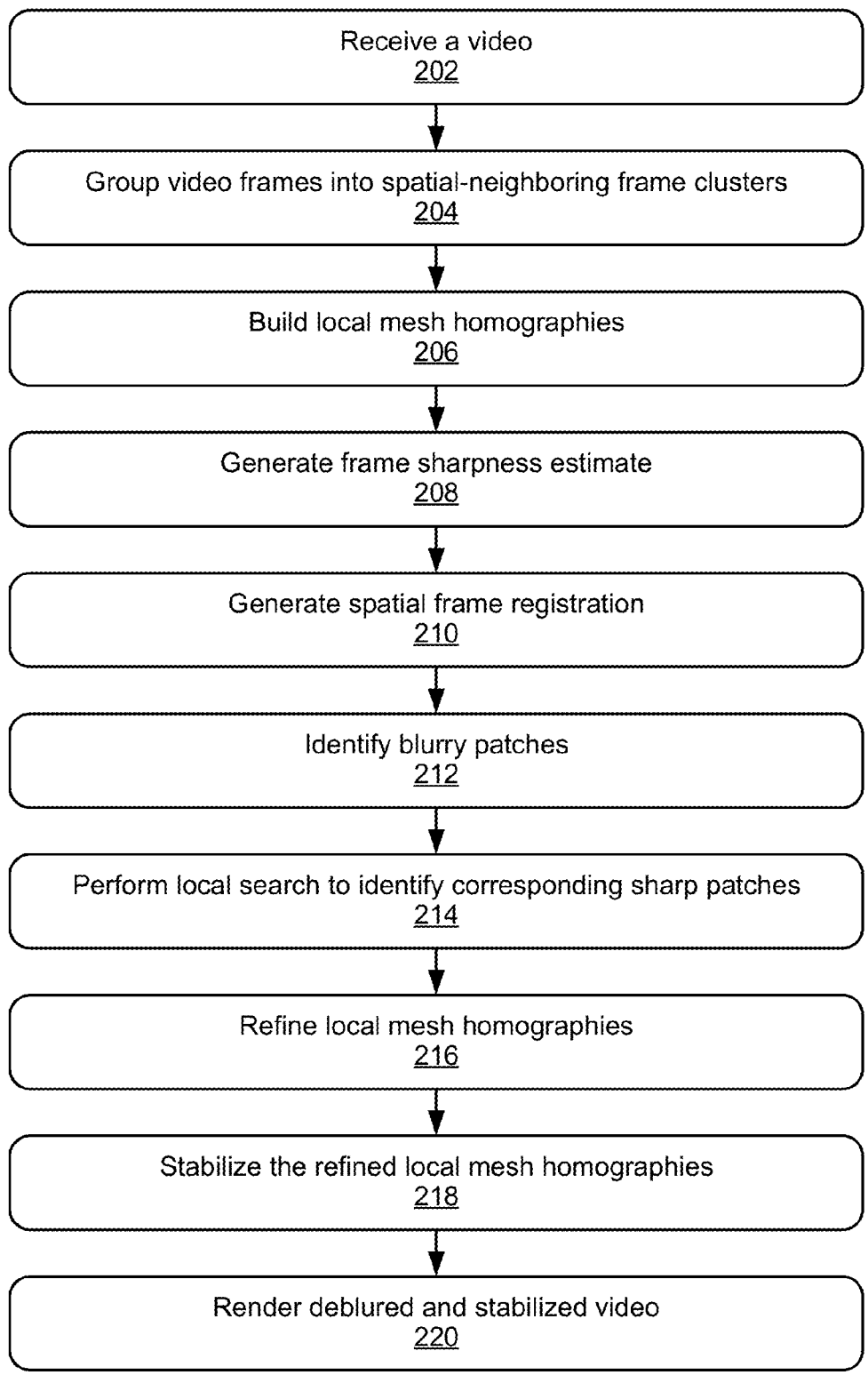
FIG. 2 illustrates a procedure in an example implementation in which a deblurring and stabilization module is implemented to jointly deblur and stabilize a video in accordance with one or more embodiments.

FIG. 2 illustrates a procedure 200 in an example implementation in which deblurring and stabilization module 104 is implemented to jointly deblur and stabilize a video in accordance with one or more embodiments.

At 202, a video is received by module 104. The video may be captured using a video-capturing device, which may be implemented as computing device 102 or a video-capturing device separate from computing device 102. The video may include shakiness and blur caused by shaking of the video-capturing device when the video is captured.

At 204, spatial-neighboring video frames of the video are grouped into spatial-neighboring frame clusters. As described herein, spatial-neighboring video frames correspond to frames of the video that include a large overlap in content. Generally, each spatial-neighboring frame cluster will include at least a few sharp video frames. Thus, grouping the video frames into spatial-neighboring frame clusters enables module 104 to more quickly and efficiently identify sharp patches in video frames that have similar content to a blurry video frame.

At 206, local mesh homographies are built for video frames in each spatial-neighboring frame cluster. For example, module 104 builds local mesh homographies between video frames in each spatial-neighboring frame cluster generated at step 204. As described herein, a "local mesh homography" is a mesh of multiple regions corresponding to a video frame, where each region includes a homography that provides a mapping between a region in the video frame and a corresponding region in a different video frame. Thus, the total number of homographies in the local mesh homography corresponds to the number of regions in the mesh. Module 104 is able to quickly and efficiently generate the local mesh homographies because module 104 can easily identify which video frames are spatial-neighbors based on the spatial-neighboring frame clusters generated at step 204.

Figure 3:
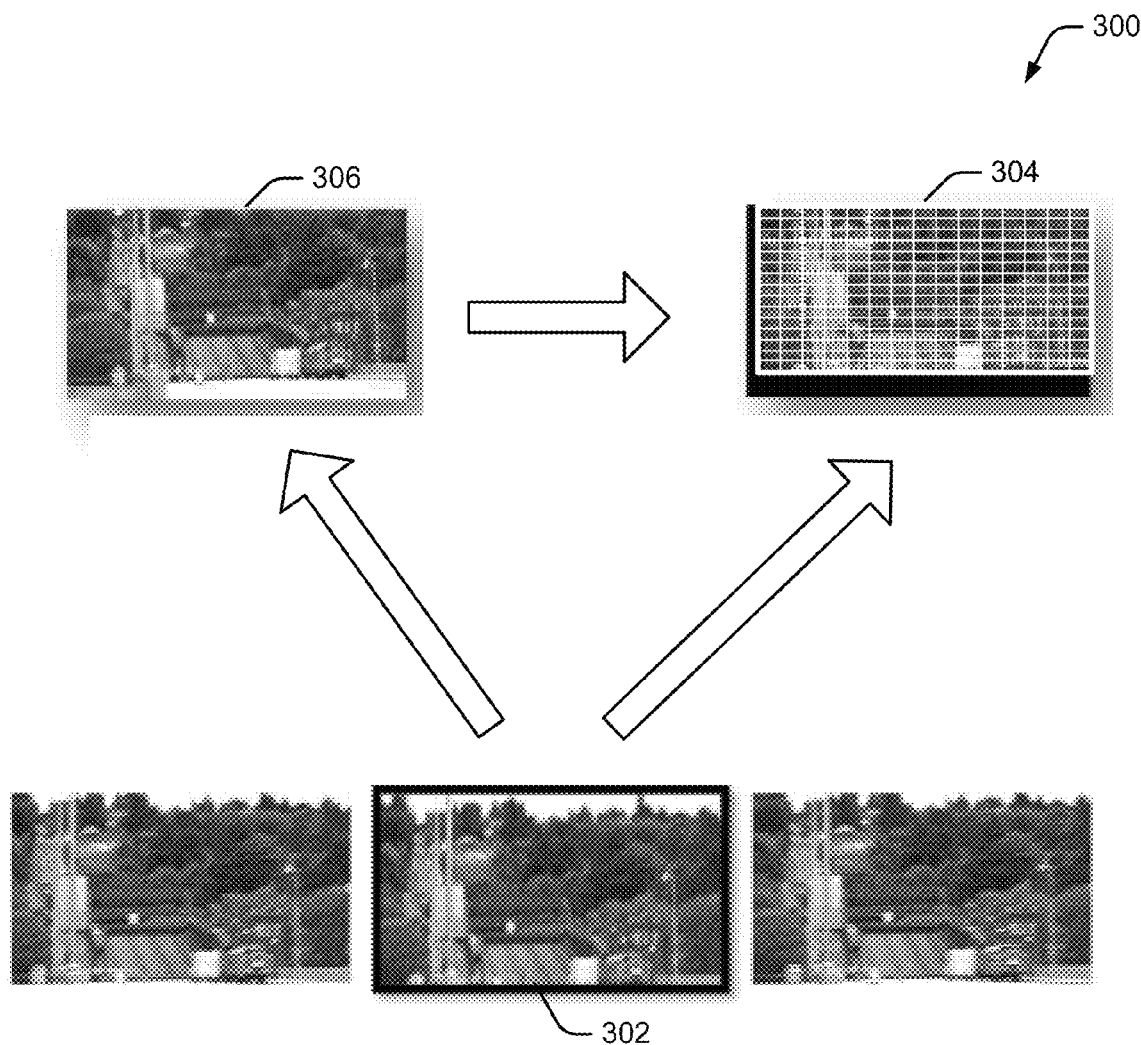
FIG. 3 illustrates an example of building a local mesh homography in accordance with one or more embodiments.
Figure 4:
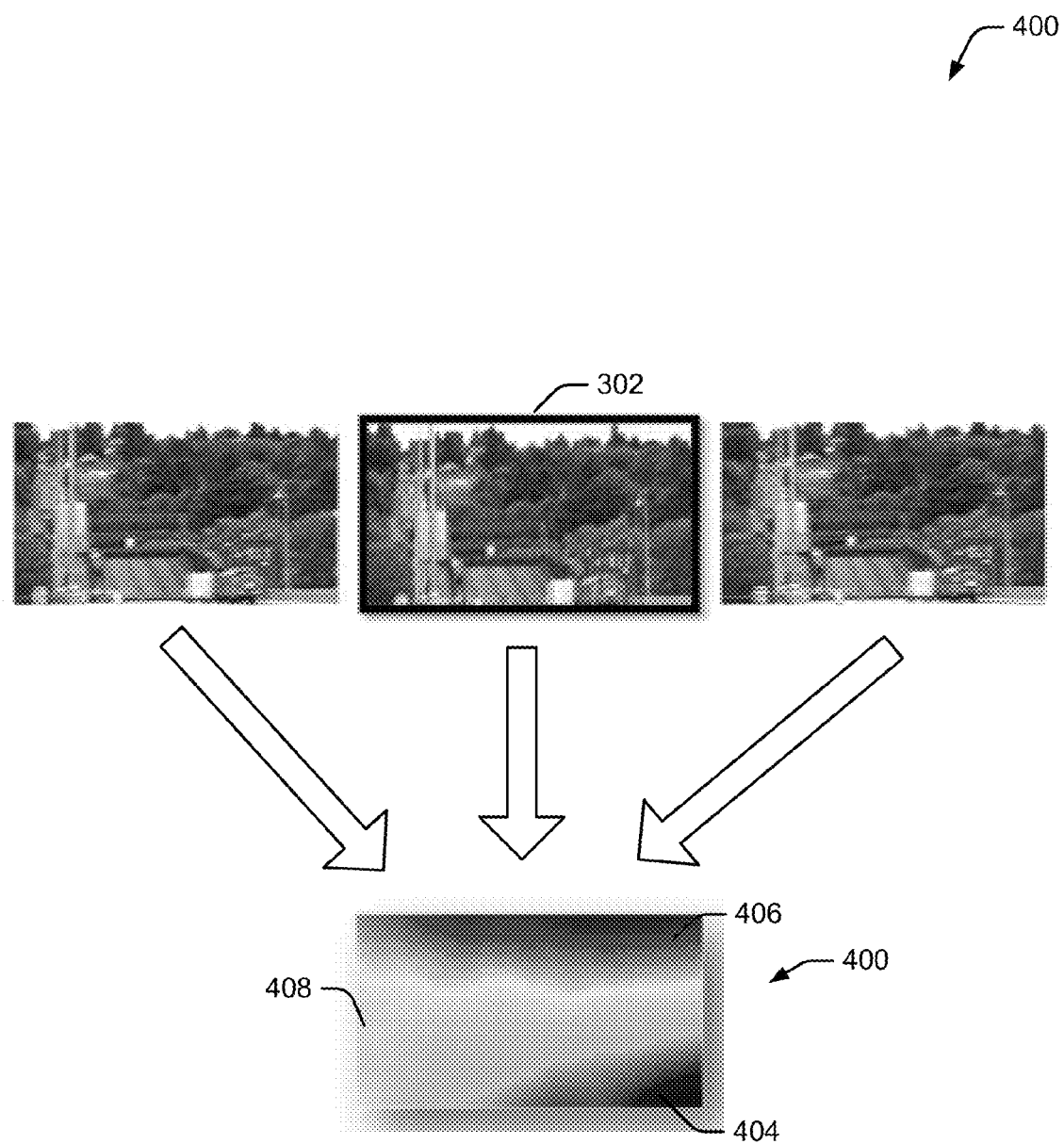
FIG. 4 illustrates an example of generating a frame sharpness map for a video frame in accordance with one or more embodiments.

Consider, for example, FIG. 3 which illustrates an example 300 of building a local mesh homography. In this example, a blurry frame 302 corresponds to a video frame of the video that is blurry. Module 104 generates a local mesh homography 304 by projecting blurry frame 302 to a reference frame 306 of the video. As illustrated in FIG. 3, the local mesh homography 304 corresponds to blurry frame 302 and includes multiple regions or cells. For each of these regions, module 104 estimates a homography that corresponds to a transformation of pixels in the region in blurry frame 302 to corresponding pixels in a corresponding region in reference frame 306. Thus, each region of local mesh homography 304 maps a region of blurry frame 302 to a corresponding region of reference frame 306.

At 208, a frame sharpness estimate is generated for each video frame. Module 104 can generate the frame sharpness estimate using the local mesh homographies to determine an absolute displacement of pixels between adjacent video frames. To do so, module 104 estimates the sharpness of each pixel in a video frame by examining the motion of regions in the video frame in the local mesh homography. For example, each region in the local mesh homography corresponds to motion between video frames. Thus, if motion is present, a pixel in a region of a current video frame will be different than a corresponding pixel in a corresponding region of a previous video frame. A large amount of motion between video frames indicates that the pixel is likely blurry. In contrast, if motion is not present, the pixel in the region of the current video frame will be the same or similar to the corresponding pixel in the corresponding region of the previous video frame. A small amount of motion between video frames indicates that the pixel is likely sharp.

In one or more implementations, for a pixel x in a frame $f_i$, module 104 can estimate sharpness using the following algorithm:

$$\alpha_i(x) = \exp\left(-\frac{\|\tilde{H}_{i-1}^{-1}(x) - x\|^2 + \|\tilde{H}_i(x) - x\|^2}{2\sigma_i^2 \tilde{H}}\right)$$

In this algorithm, $\tilde{H}$ is a homography function that maps a pixel in a current frame to a pixel position in a reference frame. The algorithm computes the displacement of pixel x as the video-capturing device moves from frame $f_{i-1}$ to $f_{i+1}$ through $f_i$. If the frame-to-frame motion of x is close to a value of 1, then the image patch centered at x is likely to be sharp because $\tilde{H}_{i-1}^{-1}$ and $\tilde{H}_i$ are close to equal. In this algorithm, if the value of $\alpha_i(x)$ is close to a value of 1, module 104 determines that there is a small amount of motion between frames and that the pixel is sharp. In contrast, if the value of $\alpha_i(x)$ is closer to a value of 0, module 104 determines that there is a large amount of motion between frames and that the pixel is blurry.

In one or more embodiments, module 104 uses these values to generate a frame sharpness map that provides an indication of the level of sharpness of pixels in each video frame. Consider, for example, FIG. 4 which illustrates an example 400 of generating a frame sharpness map for a video frame. In this example, module 104 generates a frame sharpness map 402 for blurry frame 302 (FIG. 3). Frame sharpness map 402 includes sharp regions 404 corresponding to regions of blurry frame 302 with a low amount of blur. For example, sharp regions 404 may correspond to regions of blurry frame 302 that receive a sharpness estimation score close to 1. Frame sharpness map 402 may also include blurry regions 406 corresponding to regions of blurry frame 302 with a high amount of blur. For example, blurry regions 406 may correspond to regions of blurry frame 302 that received a sharpness estimation score closer to 0. Frame sharpness map 402 may also include regions 408 corresponding to regions of blurry frame 302 that are in between sharp and blurry. In some cases, frame sharpness map 402 may be color coded to indicate any number of different levels of blur. For example, frame sharpness map 402 may be color coded to indicate a level of blur on a scale of 0 to 1, where blurry regions have a sharpness estimation score closer to 0 and sharp regions have a sharpness estimation score closer to 1.

At step 210, a spatial frame registration is generated using the local mesh homographies and the frame sharpness estimates. The spatial frame registration can be implemented as a look-up table that maps each pixel in a video frame of a spatial-neighboring frame cluster to corresponding pixels in other video frames in the spatial-neighboring frame cluster. Thus, as will be described in more detail below, module 104 can use the spatial frame registration to quickly and efficiently identify candidate sharp pixels to replace a corresponding blurry pixel.

Figure 5:
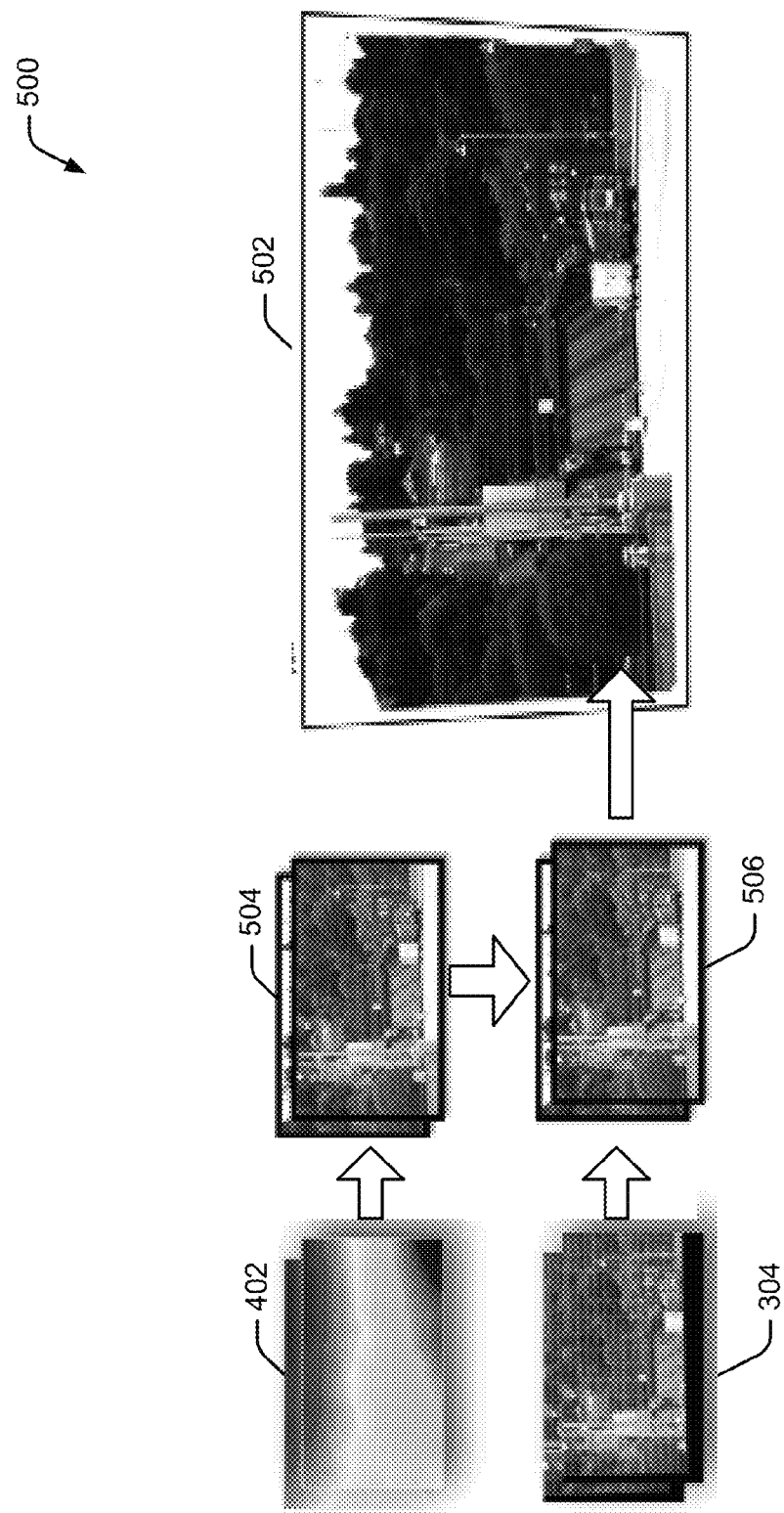
FIG. 5 illustrates an example of generating a spatial frame registration in accordance with one or more embodiments.

Consider, for example, FIG. 5 which illustrates an example 500 of generating a spatial frame registration. In this example, module 104 generates a spatial frame registration 502 using the sharpness estimate maps 402 and the local mesh homographies 304. First, module 104 identifies sharp frames 504 using frame sharpness map 402. Then, module 104 applies the local mesh homographies 304 to sharp frames 504 to identify sharp spatial-neighboring frames 506. For example, module 104 aligns all of the frames in the global space such that multiple frames of the video will partially overlap due to shared content. Module 104 determines which pixels are sharper and which are blurrier, for each pixel location, using the sharpness estimation maps 402, and can select the sharpest pixel at each pixel location to generate the spatial frame registration.

For example, consider that a video includes 30 video frames, and that video frames 1, 22, and 30 have been placed into the same spatial-neighboring frame cluster by module 104. In this example, the spatial frame registration enables module 104 to quickly map any pixel location in video frame 22 into video frame 1 or video frame 30, and vice versa. Thus, module 104 can quickly replace a blurry pixel in video frame 1 or 30 with a corresponding sharp pixel from video frame 22.

At step 212, one or more blurry patches are identified in one or more video frames, and at step 214, for each blurry patch, the spatial frame registration is used to perform a local search to identify a corresponding sharp patch in a spatial-neighboring video frame to replace the blurry patch.

Figure 6:
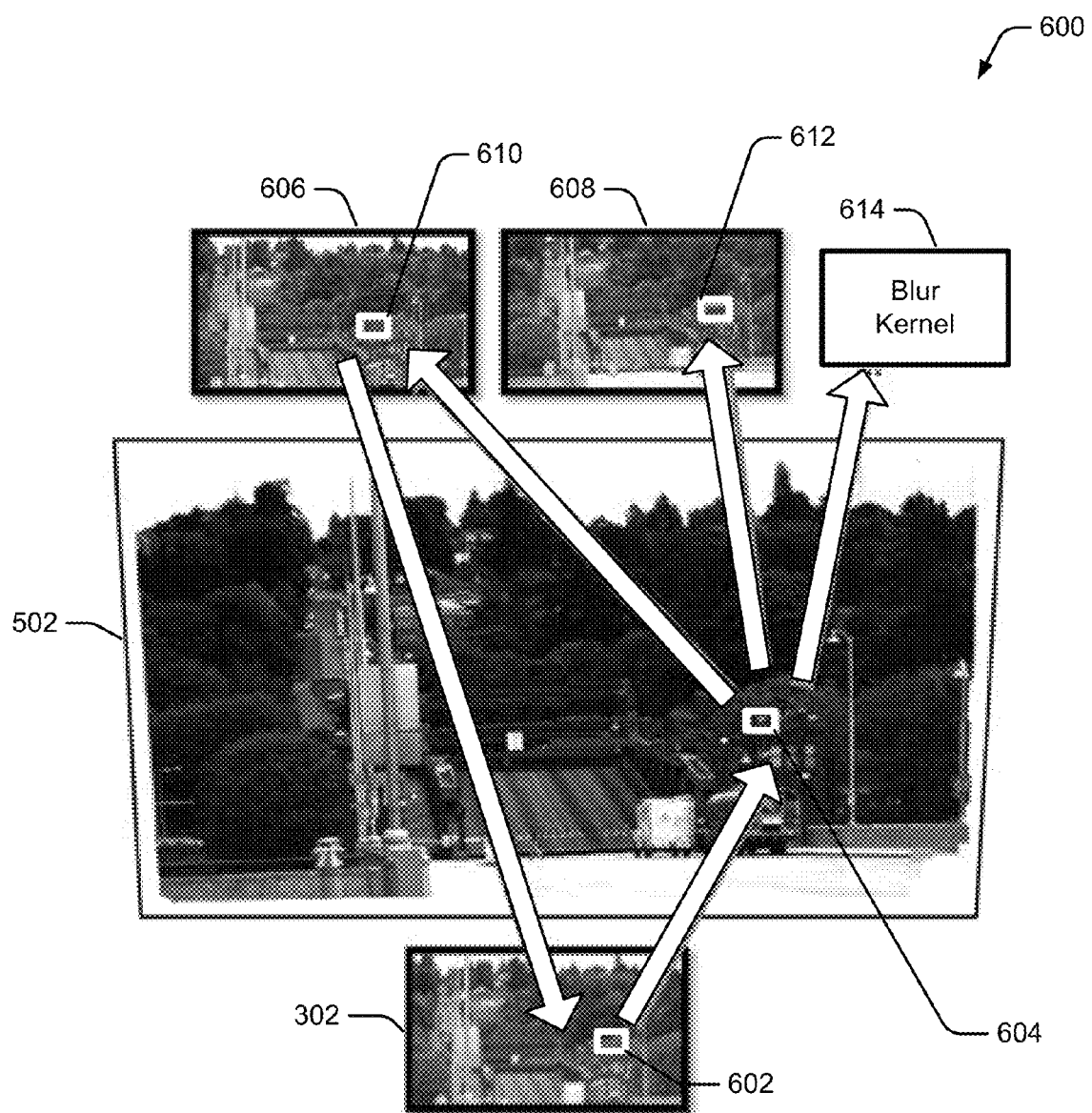
FIG. 6 illustrates an example of using the spatial frame registration to perform a local search to identify a sharp patch in a frame in a spatial-neighboring frame cluster to replace a blurry patch in accordance with one or more embodiments.

Consider, for example, FIG. 6 which illustrates an example 600 of using the spatial frame registration to perform a local search to identify a sharp patch in a video frame in the spatial-neighboring frame cluster to replace a blurry patch. In this example, module 104 identifies a blurry patch 602 in blurry frame 302. Blurry patch 602 corresponds to a building behind a school bus in blurry frame 302.

Next, module 104 identifies a corresponding reference patch 604 in the spatial frame registration 502 generated at step 208, and uses reference patch 604 to identify one or more sharp frames in the same spatial-neighboring frame cluster that include corresponding sharp patches. In example 600, module 104 uses reference patch 604 to identify sharp frames 606 and 608.

Module 104 performs a local search on sharp frames 606 and 608 to locate one or more candidate sharp patches to replace blurry patch 602. In example 600, module 104 identifies candidate sharp patch 610 in sharp frame 606, and candidate sharp patch 612 in sharp frame 608. In some cases, the alignment between blurry frame and sharp frames 606 and 608 may be slightly off due to error in the local mesh homography. This error may occur because the local mesh homography is generated using frames that are blurry. In these cases, in order to identify sharp patches 610 and 612, module 104 may select the best candidate sharp patch by searching in the local neighborhood and allowing the sharp patches to shift locations.

Next, module 104 maps the candidate sharp patches 610 and 612 into blurry frame 302 using the local mesh homographies, and applies a blur kernel 614 to the candidate sharp patches. The blur kernel corresponds to the amount a pixel is blurred from one frame to the next, which is caused by motion of the video-capturing device. Thus, the local mesh homographies can be used by module 104 to generate the blur kernel. Module 104 then identifies the blurred candidate sharp patch that has is the closest match to blurry patch 602 to replace blurry patch 602.

In one or more implementation, given a current patch location in a current frame i, module 104 looks up corresponding sharp frames j from spatial frame registration 502, and warps the corresponding sharp frames j into current frame i by the respective $k^{th}$ local homography $H_{jik}$. Module 104 then applies an estimated blur kernel to the warped patches to find the best fit sharp patch out of the candidate sharp patches. In one or more embodiments, module 104 uses the following algorithm to do so:

$$\frac{\text{argmin}}{j, y} \|b_{j,y} - f_{i,x}\|^2$$

In this algorithm, $b_{j,y}$ is a patch centered at y in the blurred warped frame $b_i(\tilde{H}_{jik}(f_j))$, which is obtained by applying the blur function $b_i$ of a current frame $f_i$ to $\tilde{H}_{jik}(f_j)$, and $f_{i,x}$ is an n×n image patch in a frame $f_i$ centered at a pixel x.

At step 216, the local mesh homographies are refined. As discussed above, the local mesh homography is generated using video frames that are blurry which may cause some inaccuracies to occur for the local mesh homography. Module 104 can refine the local mesh homography using results of the local search at step 214 to improve the local mesh homography. For example, as described above with regards to step 214, for each blurry patch module 104 selects a best candidate sharp patch to replace the blurry patch. However, the best candidate sharp patch may not be what module 104 computes from the local mesh homography (e.g., there may be a small shift). Thus, module 104 selects the best candidate sharp patch by searching in the local neighborhood and allowing the sharp patches to shift locations. The shift between the best candidate sharp patch and the other search regions enable module 104 to determine the amount of displacement error in the local mesh homography. This displacement error can be used to refine the local mesh homography In one or more embodiments, module 104 uses the following algorithm to compute an extra correction term Ec(V) that can be used to refine the local mesh homography:

$$E(\hat{V}) = E_d(\hat{V}) + \alpha E_s(\hat{V}) + \beta E_c(\hat{V})$$

$$E_c(\hat{V}) = \sum_P \|\hat{V}_p T_p - \hat{p}\|^2$$

In this algorithm, $T_p$ is the translation from the displacement of the grid tile obtained from the local search, and β is the weight to control the amount of correction. In one or more embodiments, the value for β can be a default value of 0.8. The energy $E(\hat{V})$ is quadratic, and the warped mesh $\hat{V}$ can be solved by a sparse linear system solver.

In one or more embodiments, the steps of performing the local search to identify the sharp patches and refining the local mesh homographies may be performed by module 104 for multiple iterations. For example, after refining the local mesh homographies at step 216, module can use the refined local mesh homographies to perform the local search at step 214. Module 104 may implement steps 214 and 216 for any number of iterations until the local mesh homography has reached an acceptable level of refinement.

At step 218, the refined local mesh homographies are stabilized. Module 104 can stabilize the refined local mesh homographies using any stabilization technique. Such stabilization techniques are known in the art and are not discussed in more detail herein. It is to be appreciated, however, that the stabilized refined local mesh homography is more accurate than existing solutions because the local mesh homography is refined prior to stabilization.

At step 220, a deblurred and stabilized video is rendered, using the refined and stabilized local mesh homographies, by replacing blurry patches of video frames with sharp patches. In some cases, some of the sharp patches may overlap each other. For example, consider two neighboring pixels that are both blurry, and that each pixel has been replaced with a sharp patch. Since the two neighboring pixels are adjacent to each other, the sharp patches may overlap.

Thus, in one or more implementations, module 104 merges overlapping sharp patches into a single sharp patch that can be used to replace the blurry patch. Module can merge the sharp patches by taking an average of the overlapping sharp patches. For example, in one embodiment module 104 merges the sharp patches by taking a weighted average of the overlapping sharp patches.

Example System and Device

FIG. 7 illustrates an example system generally at 700 that includes an example computing device 702 that is representative of one or more computing systems and/or devices that may implement the various techniques described herein. This is illustrated through inclusion of deblurring and stabilization module 104, which operates as described above. The computing device 702 may be, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
    identifying one or more blurry patches in one or more video frames of a video;
    for each blurry patch, performing a local search, using a spatial frame registration, to identify a corresponding sharp patch in a spatial-neighboring video frame to replace the blurry patch, the spatial frame registration mapping pixels in a spatial-neighboring video frame to corresponding pixels in other spatial-neighboring video frames;
    refining local mesh homographies based on the local search, each of the local mesh homographies comprising a mesh of multiple regions corresponding to a video frame, and each region comprising a homography that provides a mapping between a region in the video frame and a corresponding region in a different video frame;
    stabilizing the refined local mesh homographies; and
    rendering a deblurred and stabilized video, using the refined and stabilized local mesh homographies, by replacing the one or more blurry patches in the one or more video frames with corresponding sharp patches.

2. The computer-implemented method of claim 1, wherein a generation of the spatial frame registration comprises:
    grouping spatial-neighboring video frames of the video into spatial-neighboring frame clusters;
    building the local mesh homographies for the video frames in each spatial-neighboring frame cluster;
    generating a frame sharpness estimate for each video frame; and
generating the spatial frame registration using the local mesh homographies and the frame sharpness estimates.

3. The computer-implemented method of claim 2, wherein the generating the frame sharpness estimate comprises estimating the frame sharpness of each video frame using the local mesh homographies to determine an absolute displacement of pixels between adjacent video frames.

4. The computer-implemented method of claim 2, wherein the generating the frame sharpness estimate further comprises generating a frame sharpness map that provides an indication of a level of sharpness of pixels in each video frame.

5. The computer-implemented method of claim 1, wherein spatial-neighboring video frames correspond to video frames with a large overlap in content.

6. The computer-implemented method of claim 1, wherein the spatial frame registration comprises a look-up table that maps pixels in a spatial-neighboring video frame to corresponding pixels in other spatial-neighboring video frames.

7. The computer-implemented method of claim 1, wherein the performing the local search further comprises:
    identifying a blurry patch in a blurry video frame in a spatial-neighboring frame cluster;
    identifying a corresponding reference patch in the spatial frame registration;
    identifying, using the corresponding reference patch, one or more sharp video frames in the spatial-neighboring frame cluster;
    performing the local search on the one or more sharp video frames to identify one or more candidate sharp patches to replace the blurry patch;
    mapping the one or more candidate sharp patches to the blurry video frame using the local mesh homographies;
    applying a blur kernel to the one or more candidate sharp patches; and
    identifying the blurred candidate sharp patch that is a closest match to the blurry patch to replace the blurry patch.

8. The computer-implemented method of claim 1, further comprising repeating the performing the local search and refining the local mesh homographies for one or more iterations.

9. A computer-readable storage device comprising instructions stored thereon that, responsive to execution by a processor, perform operations comprising:
    building local mesh homographies for video frames of a video that are grouped into spatial-neighboring frame clusters;
    generate a spatial frame registration, using the local mesh homographies, that maps each pixel in a video frame of a spatial-neighboring frame cluster to corresponding pixels in other video frames of the spatial-neighboring frame cluster;
    for each blurry patch in a video frame, perform a local search, using the spatial frame registration, to identify a corresponding sharp patch in a video frame of the spatial-neighboring frame cluster to replace the blurry patch;
    refining the local mesh homographies based on the local search;
    stabilizing the refined local mesh homographies; and
    rendering a deblurred and stabilized video, using the refined and stabilized local mesh homographies, by replacing blurry patches of frames of the video with sharp patches.

10. The computer-readable storage device of claim 9, wherein the operations further comprise repeating the performing the local search and the refining the local mesh homographies for one or more iterations.

11. The computer-readable storage device of claim 9, wherein the performing the local search further comprises:
    identifying a blurry patch in a blurry frame of a spatial-neighboring frame cluster;
    identifying a corresponding reference patch in the spatial frame registration;
    identifying, using the corresponding reference patch, one or more sharp frames in the spatial-neighboring frame cluster;
    performing the local search on the one or more sharp frames to identify one or more candidate sharp patches to replace the blurry patch;
    mapping the one or more candidate sharp patches to the blurry frame using the local mesh homographies;
    applying a blur kernel to the one or more candidate sharp patches; and
    identifying the blurred candidate sharp patch that is a closest match to the blurry patch to replace the blurry patch.

12. The computer-readable storage device of claim 9, wherein the generating the spatial frame registration comprises:

grouping spatial-neighboring video frames of the video into spatial-neighboring frame clusters;

building the local mesh homographies for the video frames in each spatial-neighboring frame cluster;

generating a frame sharpness estimate for each video frame; and generating the spatial frame registration using the local mesh homographies and the frame sharpness estimates.

13. A computing device comprising:

at least a memory and a processor to implement a deblurring and stabilization module, the deblurring and stabilization module configured to perform operations comprising:

identifying one or more blurry patches in one or more video frames of a video;

for each blurry patch, performing a local search, using a spatial frame registration, to identify a corresponding sharp patch in a spatial-neighboring video frame to replace the blurry patch, the spatial frame registration mapping pixels in a spatial-neighboring video frame to corresponding pixels in other spatial neighboring video frames;

refining local mesh homographies based on the local search, each of the local mesh homographies comprising a mesh of multiple regions corresponding to a video frame, and each region comprising a homography that provides a mapping between a region in the video frame and a corresponding region in a different video frame;

stabilizing the refined local mesh homographies; and rendering a deblurred and stabilized video, using the refined and stabilized local mesh homographies, by replacing the one or more blurry patches in the one or more video frames with corresponding sharp patches.

14. The computing device of claim 13, wherein the deblurring and stabilization module is further configured to perform operations comprising:

grouping spatial-neighboring video frames of the video into spatial-neighboring frame clusters;

building the local mesh homographies for the video frames in each spatial-neighboring frame cluster;

generating a frame sharpness estimate for each video frame; and generating a spatial frame registration using the local mesh homographies and the frame sharpness estimates.

15. The computing device of claim 14, wherein the deblurring and stabilization module is configured to generate the frame sharpness estimate by estimating the frame sharpness of each video frame using the local mesh homographies to determine an absolute displacement of pixels between adjacent video frames.

16. The computing device of claim 14, wherein the deblurring and stabilization module is configured to generate the frame sharpness estimate by generating a frame sharpness map that provides an indication of a level of sharpness of pixels in each video frame.

17. The computing device of claim 13, wherein the spatial-neighboring video frames correspond to video frames with a large overlap in content.

18. The computing device of claim 13, wherein the spatial frame registration comprises a look-up table that maps pixels in a spatial-neighboring video frame to corresponding pixels in other spatial-neighboring video frames.

19. The computing device of claim 13, wherein the deblurring and stabilization module is configured to perform the local search by:

identifying a blurry patch in a blurry video frame in a spatial-neighboring frame cluster;

identifying a corresponding reference patch in the spatial frame registration;

identifying, using the corresponding reference patch, one or more sharp video frames in the spatial-neighboring frame cluster;

performing the local search on the one or more sharp video frames to identify one or more candidate sharp patches to replace the blurry patch;

mapping the one or more candidate sharp patches to the blurry video frame using the local mesh homographies;

applying a blur kernel to the one or more candidate sharp patches; and identifying the blurred candidate sharp patch that is a closest match to the blurry patch to replace the blurry patch.

20. The computing device of claim 13, wherein the deblurring and stabilization module is configured to repeat the performing the local search and refining the local mesh homographies for one or more iterations.

* * * * *

UNITED STATES PATENT AND TRADEMARK OFFICE
CERTIFICATE OF CORRECTION

| | | |
|---|---|---|
| PATENT NO. | : 9,224,194 B2 | Page 1 of 1 |
| APPLICATION NO. | : 14/160424 | |
| DATED | : December 29, 2015 | |
| INVENTOR(S) | : Wang et al. | |

It is certified that error appears in the above-identified patent and that said Letters Patent is hereby corrected as shown below:

Column 12, line 29, in claim 9, delete "generate", insert -- generating --, therefor.

Column 12, line 34, in claim 9, after "video frame" delete "perform", insert -- performing --, therefor.

Signed and Sealed this
Nineteenth Day of April, 2016

Michelle K. Lee
*Director of the United States Patent and Trademark Office*